US012298935B2

(12) United States Patent
Revsin et al.

(10) Patent No.: US 12,298,935 B2
(45) Date of Patent: May 13, 2025

(54) HYBRID CLOUD EVENT NOTIFICATION MANAGEMENT (71) Applicant: HITACHI VANTARA LLC, Santa Clara, CA (US)

(72) Inventors: Vitaly Revsin, Andover, MA (US); Richard Bramante, North Billerica, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 0 days.

(21) Appl. No.: 18/283,026

(22) PCT Filed: Apr. 7, 2021

(86) PCT No.: PCT/US2021/026090
§ 371 (c)(1),
(2) Date: Sep. 20, 2023

(87) PCT Pub. No.: WO2022/216280
PCT Pub. Date: Oct. 13, 2022

(65) Prior Publication Data
US 2024/0160606 A1    May 16, 2024

(51) Int. Cl.
G06F 16/30    (2019.01)
G06F 9/54     (2006.01)
G06F 16/14    (2019.01)
G06F 16/182   (2019.01)

(52) U.S. Cl.
CPC .............. G06F 16/14 (2019.01); G06F 9/546 (2013.01); G06F 16/182 (2019.01)

(58) Field of Classification Search
CPC ............................... G06F 16/14; G06F 16/182
See application file for complete search history.

(56) References Cited

U.S. PATENT DOCUMENTS 8,856,807 B1 * 10/2014 Khapre ................. G06Q 30/06
714/48
2003/0146929 A1   8/2003 Baldwin et al.
2003/0149769 A1   8/2003 Axberg et al.
2006/0107265 A1   5/2006 Schulz et al.
(Continued)

OTHER PUBLICATIONS

International Search Report of PCT/US2021/026090 dated Jun. 29, 2021.
(Continued)

Primary Examiner — Khanh B Pham
(74) Attorney, Agent, or Firm — MATTINGLY & MALUR, PC (57) ABSTRACT In some examples, a computing device may receive a first object. Further, the computing device may be able to communicate with a first network storage system over a network. The computing device may determine, from metadata for the first object, whether the metadata for the first object matches at least one notification rule. Based on determining that the metadata for the first object matches a rule expression of a first notification rule, the computing device may generate a first event notification corresponding to the first object. Further, the computing device may send the first event notification to a first queue specified by the first notification rule. For instance, the first queue may be provided by the first network storage system.

20 Claims, 6 Drawing Sheets (56) References Cited

U.S. PATENT DOCUMENTS

| | | |
|---|---|---|
| 2007/0083866 A1 | 4/2007 | Mani et al. |
| 2008/0077988 A1* | 3/2008 | Small ................. G06F 11/3476 |
| | | 726/22 |
| 2017/0161288 A1* | 6/2017 | Feldman ............... G06F 16/164 |
| 2020/0028701 A1* | 1/2020 | Liu .................... H04W 68/005 |
| 2022/0012227 A1* | 1/2022 | Botwick ............... G06F 16/252 |
| 2022/0335032 A1* | 10/2022 | Girulat, Jr. ......... G06Q 10/0635 |

OTHER PUBLICATIONS

Extended European Search Report received in corresponding European Application No. 21936206.8 dated Dec. 19, 2024.

\* cited by examiner

```
{
"QueueConfigurations": [
  {                                    ⟵402
   "Id": "id1",
   "QueueArn": "{'version': '1.0', 'notifications': { 'type': 'VENDOR1_QUEUE',
'queue': 'myqueue1', 'region': 'us-east-2',
'accessKey': 'QUtJQVNPS1cyRUkzQVlKSVZMTkY=', 'secretKey':
nUydUZaaFZqQLOEFhOFdmUQ==',
'host': 'queueservice.vendor1.com', 'port': '433'}",
    "Events": ["s3:ObjectRemoved:*"],
    "RuleExpression": {
     "Key": {
      "Rules": [
       {
        "Name": "expression",
        "Value": "((size > 10MB) && (suffix=.mp4 || suffix=.avi) &&
(01/01/2018 < date-created && date-created < 12/31/2018))"
       }
      ]
     }
    }
  },
  {                                    ⟵404
   "Id": "id2",
   "QueueArn": "{'version': '1.0', 'notifications': { 'type': 'VENDOR2_QUEUE',
'queue': 'myqueue2', 'region': 'us-east-2',
'accessKey': 'QUtJQVNPS1cyRUkzQVlKSVZMTkY=', 'secretKey':
'bOQnUydUZaaFZqQTQ0eGsQ==',
'host': 'queueservice.vendor1.com', 'port': '433'}",
    "Events": ["s3:ObjectCreated:*"],
    "RuleExpression": {
     "Key": {
      "Rules": [
       {
        "Name": "expression",
        "Value": "((size > 1MB) && (replica=true))"
       }
      ]
     }
    }
  }
 ]
}
```

HYBRID CLOUD EVENT NOTIFICATION MANAGEMENT

TECHNICAL FIELD

This disclosure relates to the technical field of data storage and event notifications.

BACKGROUND

In a hybrid cloud system, a variety of different service providing entities may be employed for storing and synchronizing data. Data may be stored and synchronized across a plurality of heterogeneous systems configured and controlled by the different entities. Further, some of the entities may provide an event notification feature by which event notifications are generated and sent, for example, to an application executing on another computing device. However, typically cloud services may have a limited capability for managing event notifications and may rely on the application to determine which event notifications are important. This can result in a large amount of network traffic for event notifications and may place a large burden on the application computing device, such as in large scale storage systems that may handle up to millions of objects per day.

SUMMARY

Some implementations include a computing device that may receive a first object. Further, the computing device may be able to communicate with a first network storage system over a network. The computing device may determine, from metadata for the first object, whether the metadata for the first object matches at least one notification rule. Based on determining that the metadata for the first object matches a rule expression of a first notification rule, the computing device may generate a first event notification corresponding to the first object. Further, the computing device may send the first event notification to a first queue specified by the first notification rule. For instance, the first queue may be provided by the first network storage system.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Some implementations herein are directed to techniques and arrangements for a distributed computer system including a hybrid cloud infrastructure able to effectively manage event notifications for targeting the event notifications and for significantly reducing the number of event notifications sent over a network. The solution herein addresses the above described problem of having too many event notifications by performing metadata analysis of events close to where metadata corresponding to the events resides. The system herein may potentially prevent millions of insignificant events from being sent to user computing devices or other computing devices set up to receive event notifications, thereby conserving network resources and computing resources. For instance, the system herein may provide event notifications that are limited to those specified for certain applications or certain users. Accordingly, implementations herein may dramatically improve system performance and reduce the number event notifications that applications receive and process.

As one example, a computing device of an object storage system may receive a first object, such as from a client device. Further, the computing device may be able to communicate with one or more network storage systems over a network. The computing device may determine, from metadata for the first object, whether the metadata for the first object matches at least one notification rule. Based on determining that the metadata for the first object matches a rule expression of at least a first notification rule, the computing device may generate a first event notification corresponding to the first object. Further, the computing device may send the first event notification to a first queue specified by the first notification rule. For instance, the first queue may be provided by the first network storage system. In addition, in some examples, based on determining that the metadata for the first object matches a rule expression of a second notification rule, the computing device may send the first event notification to a second queue specified by the second notification rule, where the second queue is different from the first queue.

Some examples herein may include a scalable object storage system having a distributed and highly available metadata data structure. The system provides quick and easy access to metadata which enables intelligent and efficient event notification in the hybrid cloud environment. For instance, one or more notification rules for examining events may be defined by one or more users as a programming expression with multiple conditions for analyzing metadata directly at the object storage system for determining whether to send an event notification to an application. The resulting event notification may be sent to one or more cloud services and/or to one or more services on-premises. Implementations herein enable users to create rich event notification rules that enable notification of events desired by the users, while avoiding sending event notifications for insignificant events. Accordingly, unlike conventional systems in which applications may receive event notifications about all events that occur within the system, and then determine whether these events match specified conditions, examples herein may manage event notifications at the object storage system itself, thereby reducing the load on the network and the load on the applications and computing devices that receive the event notifications. Additionally, examples here may allow users to define rule expressions that trigger event notifications during examination of objects for specific metadata.

Some examples herein may provide a hybrid architecture including a proprietary local storage system in communication with multiple remote public cloud and/or private cloud storage systems. Furthermore, implementations herein may provide novel approaches for performing multi-way replication across a hybrid cloud system running various different software stacks from various different providers. For discussion purposes, some example implementations are described in the environment of one or more service computing devices in communication with one or more different network storage systems from one or more different storage providers for managing storage of data and metadata and associated event notifications. However, implementations herein are not limited to the particular examples provided, and may be extended to other types of computing system architectures, other types of storage environments, other storage providers, other types of client configurations, other types of data, and so forth, as will be apparent to those of skill in the art in light of the disclosure herein.

Figure 1:
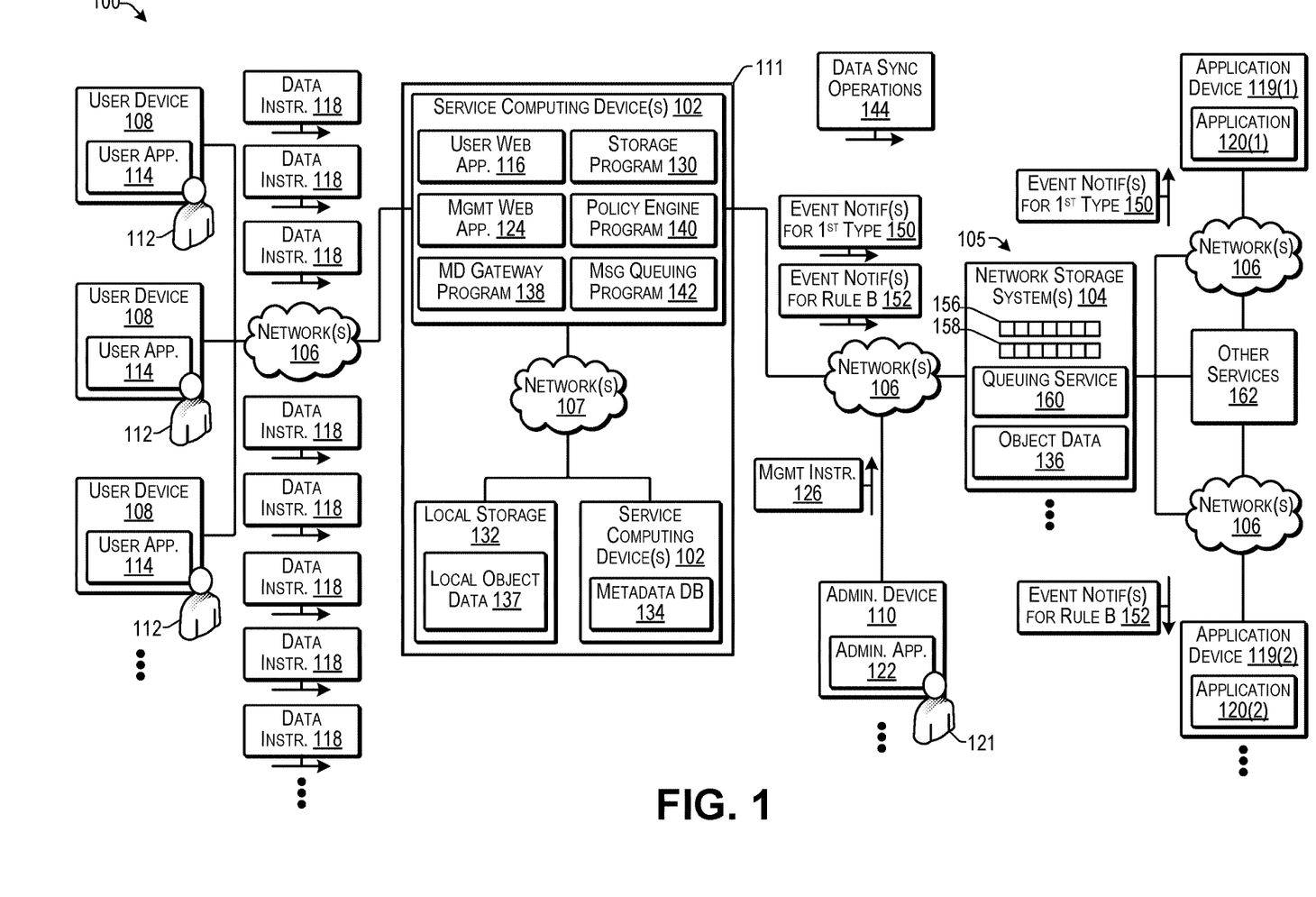
FIG. 1 illustrates an example architecture of a system able to manage event notifications in a hybrid cloud storage system according to some implementations.

FIG. 1 illustrates an example architecture of a system 100 able to manage event notifications in a hybrid cloud storage system according to some implementations. The system 100 includes a plurality of service computing devices 102 that are able to communicate with, or otherwise coupled to, at least one network storage system 104 provided by a service provider 105 through one or more networks 106. There may be a plurality of different service providers 105, and each service provider 105 of each different network storage system 104 may be a different entity unrelated to the other service providers 105. Examples of commercial network storage service providers 105 may include AMAZON WEB SERVICES, MICROSOFT AZURE, GOOGLE CLOUD, IBM CLOUD, and ORACLE CLOUD, to name a few. The network storage system(s) 104 may be referred to as "cloud storage" or "cloud-based storage" in some examples, and may enable a lower cost storage solution per gigabyte than local storage that may be available at the service computing devices 102 in some cases. Additionally, in some examples, the storage providers may alternatively be private or otherwise proprietary storage service providers 105 such as for providing access only to specific users, entities, or the like, e.g., associated with the service computing devices 102. An example of a proprietary system service provider 105 may include a configuration of HITACHI CONTENT PLATFORM.

Further, the service computing devices 102 are able to communicate over the network(s) 106 with a plurality of user computing devices 108 and one or more administrator computing devices 110. The user device 108 and the administrator device 110 may be any of various types of computing devices, as discussed additionally below.

In some examples, the service computing devices 102 may include one or more servers that may be embodied in any number of ways. For instance, the programs, other functional components, and at least a portion of data storage of the service computing devices 102 may be implemented on at least one server, such as in one or more stand-alone servers, a cluster of servers, a server farm, a data center, a cloud-hosted computing service, and so forth, although other computer architectures may additionally or alternatively be used. Additional details of the service computing devices 102 are discussed below with respect to FIG. 6.

In some cases, a plurality of the service computing devices 102 may be arranged into one or more groups, clusters, systems, or the like, e.g., at a site 111. For instance, a plurality of sites 111 may be geographically dispersed from each other such as for providing data replication, disaster recovery protection, or the like. Further, in some cases, the service computing devices 102 at a plurality of different sites 111 may be configured for securely communicating with each other, such as for providing a federation of a plurality of sites 111. Further, in other examples, one or more of the service computing devices 102 may be located separately from others of the service computing devices 102.

The one or more networks 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing devices 102, the network storage system(s) 104, the user devices 108, and the administrative devices 110 are able to communicate over the one or more networks 106 using wired or wireless connections, and combinations thereof.

In addition, the service computing devices 102 may be able to communicate with each other over one or more networks 107. In some cases, the one or more networks 107 may be a LAN, private network, or the like, while in other cases, the one or more networks 107 may include any of the networks 106 discussed above.

The service computing devices 102 may be configured to provide storage and data management services to users 112 via the user devices 108, respectively. As several non-limiting examples, the users 112 may include users performing functions for businesses, enterprises, organizations, governmental entities, academic entities, or the like, and which may include storage of very large quantities of data in some examples. Nevertheless, implementations herein are not limited to any particular use or application for the system 100 and the other systems and arrangements described herein.

Each user device 108 may be any suitable type of computing device such as a desktop, laptop, tablet computing device, mobile device, smart phone, wearable device, terminal, and/or any other type of computing device able to send data over a network. Users 112 may be associated with user devices 108 such as through a respective user account, user login credentials, or the like. Furthermore, the user devices 108 may be able to communicate with the service computing device(s) 102 through the one or more networks 106, through separate networks, or through any other suitable type of communication connection. Numerous other variations will be apparent to those of skill in the art having the benefit of the disclosure herein.

Further, each user device 108 may include a respective instance of a user application 114 that may execute on the user device 108, such as for communicating with a user web application 116 executable on the service computing device(s) 102. For instance, the user application 114 may be configured for sending user data, e.g., data objects, for storage on one or more of the network storage systems 104 and/or for receiving stored data from the network storage system(s) 104 through a data instruction 118 or the like. In some cases, the application 114 may include a browser or may operate through a browser, while in other cases, the application 114 may include any other type of application having communication functionality enabling communication with the user web application 116 over the one or more networks 106.

In some examples, the users 112 may store data to, and receive data from, the service computing device(s) 102 that their respective user devices 108 are in communication with. Accordingly, the service computing devices 102 may provide storage for the users 112 and respective user devices 108. During steady state operation there may be users 108 periodically communicating with the service computing devices 102.

In some examples, herein there may be a very large number data instructions 118 received by the service computing devices 102. Generating event notifications for each of these data instructions 118 may significantly increase network traffic and may place a burden on one or more application computing devices 119 that execute respective applications 120 that receive event notifications. In this example, a first application device 119(1) may execute a first application 120(1), a second application device 119(2) may execute a second application 120(2), and so forth. In some cases, the application devices 119 may correspond to the user devices 108 and/or the administrator devices 110. As another example, one or more of the application devices 119 may be a server or other type of computing device that is configured by the respective application 120 to receive particular event notifications. For instance, the application 120 on the application device 119 may be executed to receive particular event notifications such as for logging, tracking, and/or managing certain activities performed with respect to the service computing devices 102 and/or with respect to the data stored by the service computing devices 102.

In addition, the administrator device 110 may be any suitable type of computing device such as a desktop, laptop, tablet computing device, mobile device, smart phone, wearable device, terminal, and/or any other type of computing device able to send data over a network. For instance, administrators 121 may be associated with respective administrator devices 110, such as through a respective administrator account, administrator login credentials, or the like. Furthermore, the administrator device 110 may be able to communicate with the service computing device(s) 102 through the one or more networks 106, 107, through separate networks, or through any other suitable type of communication connection.

Further, each administrator device 110 may include a respective instance of an administrator application 122 that may execute on the administrator device 110, such as for communicating with a management web application 124 executable on the service computing device(s) 102, such as for sending management instructions for managing the system 100 and/or for sending management data for storage on the network storage system(s) 104 and/or for receiving stored management data from the network storage system(s) 104, such as through a management instruction 126 or the like. In some cases, the administrator application 122 may include a browser or may operate through a browser, while in other cases, the administrator application 122 may include any other type of application having communication functionality enabling communication with the management web application 124 over the one or more networks 106.

The service computing devices 102 may execute a storage program 130, which may provide a gateway to the network storage system(s) 104, such as for sending data to be stored to the network storage system(s) 104 and for retrieving requested data from the network storage system(s) 104 or from local storage 132. In addition, the storage program 130 may manage the data stored by the system 100, such as for managing data retention periods, data protection levels, data replication, and so forth.

The service computing devices 102 may further include a metadata data structure, such as a metadata database (DB) 134, which may be divided into a plurality of metadata DB portions, such as partitions, and which may be distributed across a plurality of the service computing devices 102. For example, the metadata DB 134 may be used for managing object data 136 stored at the network storage system(s) 104 and local object data 137 stored at the local storage 132. The metadata DB 134 may include numerous metadata about the object data 136, such as information about individual objects, how to access the individual objects, storage protection levels for the objects, storage retention periods, object owner information, object size, object type, and so forth. Further, a metadata gateway program 138 may manage and maintain the metadata DB 134 such as for updating the metadata DB 134 as new objects are stored, old objects are deleted, objects are migrated, and the like, as well as providing access to the metadata in the metadata DB 134, such as for responding to requests for accessing data and for determining whether to generate an event notification.

In addition, the service computing device(s) 102 may include a policy engine program 140 that may be executed to perform data synchronization with the network storage system(s) 104 and to also identify and forward event notifications to respective application devices 119. In some cases, the policy engine program 140 may be a module of the storage program 130, while in other cases, the policy engine program 140 may be a separate program. In some cases, the policy engine program 140 may operate in cooperation with a message queueing program 142 for synching the object data 136 with the network storage system(s) 104 and for sending selected event notifications. Examples of message queuing programs that may be used in some examples herein include open source multi-protocol message brokers such as RABBITMQ and ACTIVEMQ.

Furthermore, the policy engine program 140 may synchronize the object data 136 asynchronously with the network storage system(s) 104. For example, rather than having to perform certain storage operations to the network storage system(s) 104 and complete the operations before reporting back to a user, the storage program 130 may store the object data to the local storage 132 as local object data 137, may add metadata for the object to the local metadata database 134, such as via the metadata gateway program 138, and my reply to the requesting device with a completion message, or the like. The storage program 130 may subsequently send the data to a queue to asynchronously synchronize the data with one or more of the network storage system(s) 104 via one or more data synchronization operations 144.

In the system 100, event driven synchronization may be employed that is guided by the policy engine program 140, which is configured to apply actions such as rate control limiting and/or quality of service management to ensure that the speed of data synchronization is able to be managed by administrators. Furthermore, some examples may employ versioning for data, e.g., each update may result in a different version that can subsequently help to provide an ordering of the object data 136 on the network storage system(s) 104. Furthermore, in some examples the user metadata for each version of a data object may be synchronized along with object data, which can enable the applications to add any specific information desirable for further data management. As one example, this feature enables the maintenance of an audit trail of the applications/operators that generated the data. For example, a metadata tag may include information about the originating source or originating application, as well as the time the application created the data, which can then be used along with data versions to enable re-ordering of the versions based on the timestamp included in the metadata for that object.

In the examples herein, the policy engine program 140 may apply one or more notification rules (policies) for determining for which events to send event notifications based at least partially on analysis of metadata associated with each event. In addition, the message queuing program 142 may be employed to provide a fast and efficient way to publish events to queues and also receive the events asynchronously by polling an event from one of the queues. Each event (e.g., an action that affects the stored object data 136, such as a write, put, delete, move, etc.) received or generated within the system 100 can be queued into the messaging queuing framework for further processing. In addition, the policy engine program 140 may provide a scalable service for processing asynchronous and scheduled events. As discussed additionally below, the policy engine program 140 may poll events from the messaging queue framework and may use the metadata gateway program 138 to access the metadata in the metadata database 134 that is local and managed by the service computing device(s) 102 for determining information about each event.

As one example, suppose that the first application 120(1) executing on the first application device 119(1) is configured to receive event notifications 150 for a first type of event that may be identified by application of a first notification rule. Further, suppose that the second application 120(2) executing on the second application device 119(2) is configured to receive event notifications 152 for a second type of event that may be identified by application of a second notification rule. In some examples, as discussed additionally below, the policy engine program 140 may receive metadata for each event, and may identify any events corresponding to the first notification rule or the second notification rule. Upon identifying an event meeting the required criteria of the first notification rule, the policy engine program 140 may send a corresponding event notification 150 to a first queue 156 on one of the network storage system(s) 104. Similarly, upon identifying an event meeting the required criteria of the second notification rule, the policy engine program 140 may send a corresponding event notification 152 to a second queue 158 on one of the network storage system(s) 104.

In some examples, each network storage system(s) 104 may provide its own queuing service 160 to provide queues 156, 158, . . . , for receiving and distributing event notifications to the correct target applications. For instance, suppose in this example, that the network storage system 104 includes a first queue 156 for receiving and distributing the event notifications 150 and a second queue 158 for receiving and distributing the event notifications 152. The queues 156, 158 may be scalable hosted queues for storing messages as they travel between computers, such as for moving data between distributed components of a system without losing messages or requiring each component to be always available. For instance, the queues 156, 158 may be used to transfer messages between applications or services. Accordingly, event notifications 150 may be retrieved periodically or in real time by the application 120(1) from the queue 156; similarly, the event notifications 152 may be retrieved periodically or in real time by the application 120(2) from the queue 158.

Furthermore, the system 100 enables the same event notification to be sent to two or more different target queues. For example, an event notification can be sent to one or more queues on the cloud network storage(s) and/or to one or more queues at an on-premises network storage system. Thus, the system 100 can send the same event notifications to multiple queues at the same network storage system 104, to multiple queues at different network storage systems, which may include commercial or public network storage systems was well as on-premises or private network storage systems, such as in different locations, provided by different entities, accessible by different APIs or protocols, and so forth.

Additionally, in some examples, the event notifications 150, 152 may be received by other services 162, which may forward the event notifications 150, 152 to the correct target application 120. For instance, the other services 162 may include an event-driven code execution service, or the like, that may execute certain specified user code and/or perform other actions previously specified by a user in response to receiving certain event notifications. In addition, while event notifications for the same event may be sent to multiple target queues, the policy engine program 140 may prevent the same event notification from being sent more than once to the same target queue. In some cases, to ensure that the same event notification is not sent more than once to the same target queue, the notification rules (policies) targeting the same queue may be processed by the same policy engine instance, and the rules targeting different queues may be processed independently.

As one example, suppose that a user 112 creates a rule to receive event notifications when objects matching a specified condition are deleted. For example, the condition may be specified as follows: send an event notification for a deletion event when the size of the deleted object is (1) greater than X, (2) the object extension is Y or Z, and (3) the object was created between a first date and a second date.

In pseudocode, these conditions may be specified by the user using the following expression: (size>10 MB && (suffix=.mp4||suffix=.avi) && (Jan. 1, 2018<date-created && date-created<Dec. 31, 2018)). Accordingly, whenever an event in which an object is deleted is detected, and the object is larger than 10 MB, is an mp4 or avi file, and was created between Jan. 1, 2018 and Dec. 31, 2018, an event notification is generated and sent to a specified application. For example, the event notification may indicate the time and date of the deletion, may identify the name and path of the object deleted, and may include other metadata about the deleted object.

As another example, suppose that an administrative user 121 (e.g., a data retention officer) creates a rule to cause an event notification to be generated and sent when an attempt is made to delete or modify an object under retention or legal hold. For instance, the user may also set some additional conditions, such as specifying a creation date range for the object.

In pseudocode, these conditions may be specified by the user using the following expression: (tag/importance: HIGH && Jan. 1, 2018<date-created && date-created<Dec. 31, 2018)). Accordingly, whenever an event in which an attempt is made to delete an object that is tagged as being of high importance, and the object was created between Jan. 1, 2018 and Dec. 31, 2018, an event notification is generated and sent to a specified application. For example, the event notification may identify the name and path of the object, and may include other metadata such as a username of a user that attempted to delete the object.

As another example, suppose that a user 112 creates a rule to cause an event notification to be generated and sent when the system detects an object containing Personal Identifiable Information, such as full name, social security number, email address, or the like, and the object is an xml file or a json file. In pseudocode, these conditions may be specified by the user using the following expression: as (tag/project=ABC && (suffix=.xml||suffix=json)). Accordingly, implementations herein enable users to set specific conditions for receiving event notifications for specified events that take place within the system 100.

Figure 2:
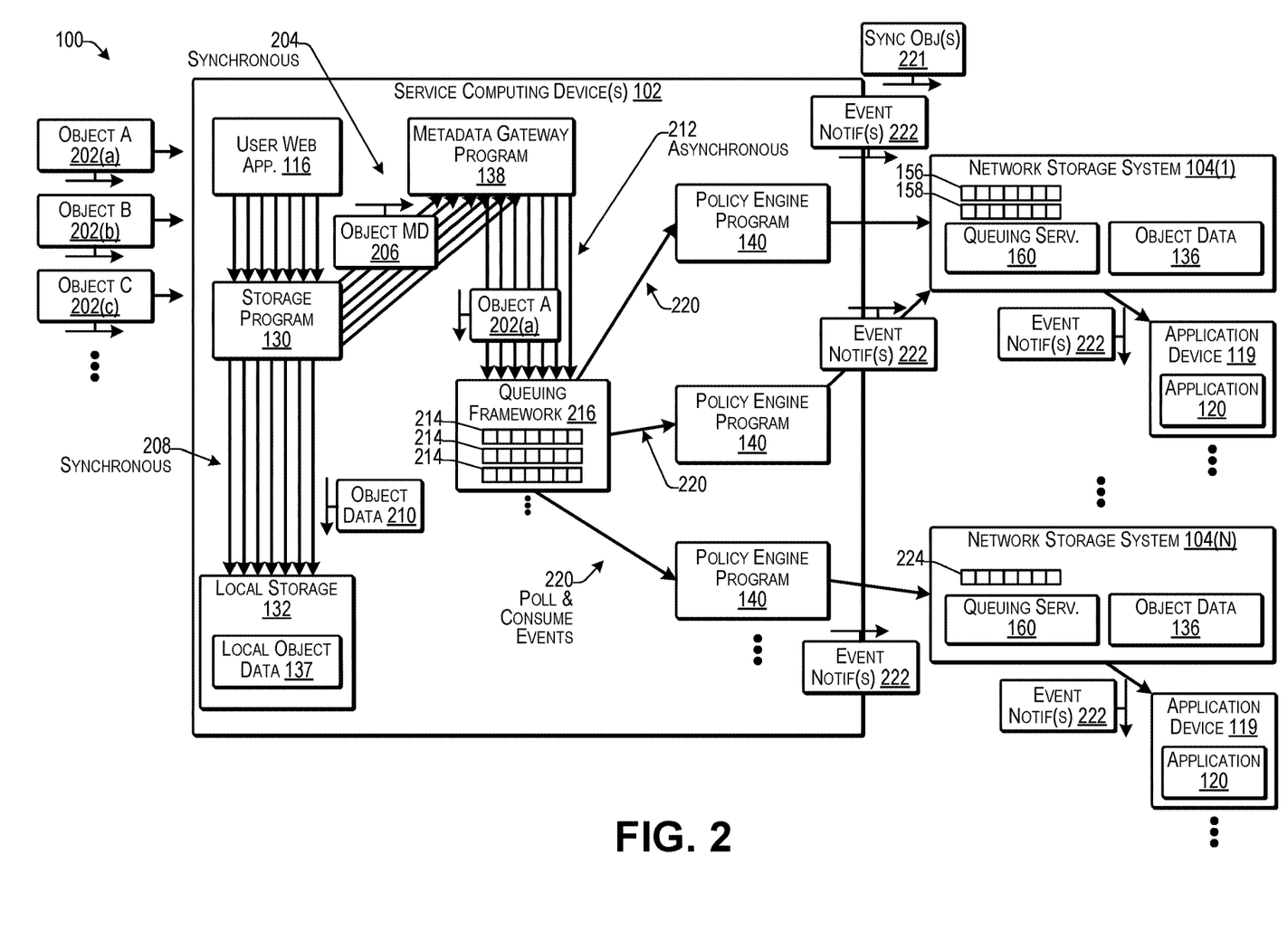
FIG. 2 is a block diagram illustrating an example logical configuration of the system 100 for ingesting data operations according to some implementations.

FIG. 2 is a block diagram illustrating an example logical configuration 200 of the system 100 for ingesting data operations according to some implementations. In some examples, the logical configuration 200 may correspond to the system 100 discussed above or any of various other possible computing system architectures, as will be apparent to those of skill in the art having the benefit of the disclosure herein. The system 100 may enable distributed object storage and may include the use of web applications as a front end for users and administrators. This example illustrates a plurality of the network storage systems 104(1)-104(N). In some cases, the system 100 may store objects 202, such as object A 202(a), object B 202(b), object C 202(c), . . . , to one or more of the network storage systems 104(1)-104(N), such as in buckets that may be created by the users and/or administrators. The system 100 may enable complex management and storage of data using resources distributed across local and cloud systems.

Some examples herein may be based at least in part on executing micro services running in containers that are able to function as independent compute engines. For instance, multiple instances or containers of each of the services, e.g., the storage program 130, the metadata gateway program 138 and/or the policy engine program 140 may be executed across a distributed cluster, e.g., in multiple ones of the service computing devices 102. The multiple micro service instances may enable scaling of the policy engine program 140 across the distributed cluster or other distributed computing architecture, such as may be needed due to disparate application workloads.

As an example, on ingest of data from an application (e.g., via the user web application 116 or the management web application 124), in real time, two synchronous actions are performed. For example, suppose that a user has saved object A 202(a) via the user web application 116. First, as indicated at 204, the storage program 130 may create object metadata (MD) 206 for object A that includes information such as object name as input by the application, a version ID, a timestamp, object size, user metadata tags, an access control list, and the like. Additionally, also synchronously, as indicated at 208, object data 210 of the object A 202(a) is stored to the local storage 132 as part of the local object data 137, and a stored object locator ID is added to the object a metadata 206. The metadata gateway program 138 may add the object metadata 206 of the object A 202(a) to the metadata database 134 (not shown in FIG. 2). Because these two actions are performed in real time, the storage program 130 may return a response to the user device that sent the object A 202(a) indicating that the storage of the object A 202(a) has been successfully completed. As indicated at 212, the metadata gateway program 138 may subsequently asynchronously generate a synchronization event for object A 202, and may add the synchronization event to one or more queues 214 in a message queuing framework 216 provided by the message queuing program 142 discussed above. Other received data objects, such as objects 202(b), 202(c), . . . , or other user actions or instructions that affect the stored object data 136 may be similarly ingested and queued for synchronization with the network storage systems 104.

Similar to the rest of the micro services herein, the queue(s) 214 may be scaled up or down independent of the other services. For example, as provided by the message queuing framework 216, the queue(s) 214 may be both stateful and durable. For example, if one queue 214 becomes corrupted or goes out of service, one or more configurable redundant copies of the events in the queue 214 may be maintained across at least one other queue 214 for recovery on failure. The event driven messaging queue framework 216 reduces traffic on the metadata gateway program 138, which is executed for performing metadata storage and retrieval so that that metadata gateway program 138 does not get flooded with queries for performing synchronization. Moreover, the queuing framework 216 can also help segregate mirroring events from all other synchronization events in the system.

The policy engine program 140 may be executed to provide a set of containerized services (e.g., separate instances provided by the policy engine program 140) that operate in the background to poll and consume events from the queues 214 for each synchronization target, as indicated at 220. For example, the policy engine program 140 may pull synchronization events off the queue 214 asynchronously and may synchronize the events in the queue 214 to respective ones of the network storage system(s) 104. For example, each synchronization event may have a separate target based on a particular one of the network storage system(s) 104, and a named bucket therein. Accordingly, based on techniques discussed additionally below, the policy engine program 140 may synchronize objects as indicated at 221, including metadata of objects in some cases, to the intended synchronization targets, such as a network storage system(s) 104.

In some implementations, the synchronization events may be separated into one or more outgoing queues 214. The segregation of communication using separate queues 214 may help ensure that if one of the network storage systems 104 is malfunctioning or if there are network connectivity issues, communication to others network storage system(s) 104(1)-104(N) that are functioning properly are not affected. Given that the network storage system(s) 104 may be provided by multiple different service providers, the system 100 may not be able to easily distinguish between a network storage system 104 being temporarily down or completely out of commission. Also, it may not be practical to rely on a particular network storage system 104 to provide accurate reasons for an error or failures due to, e.g., resource or quota limitations, a server undergoing maintenance, or a bug in the system.

In some examples herein, the queuing framework 216 may include a separate queue 214 for each separate remote target domain, e.g., the queuing framework 216 may include a first queue 214 for a network storage system 104(1), a second queue 214 for a second provider network storage system 104 (not shown in FIG. 2), a third queue 214 for a third provider network storage system 104 (not shown in FIG. 2), and so forth. Thus, the policy engine program 140 may execute a one-to-many synchronization of data from the service computing device(s) 102 to the network storage system(s) 104.

As mentioned above, each instance of the policy engine program 140 may pull data for synchronization off one of the queues 214, and may apply one or more rules to determine whether to send an event notification 222 to a specified target, e.g., the queues 156 or 158 at the first network storage system 104(1), a queue 224 at the Nth network storage system 104(N), and so forth. For example, the policy engine program 140 may be configurable by the users to apply a user specified rules that may include determining when to send event notifications for specified events that may occur within the system 100. Based on these user specified rules, the policy engine program 140 may consume a synchronization event from one of the queues 214, compare any metadata included with the data that is the subject of the synchronization event, and only generates an event notification if the metadata matches a specified rule for generating the event notification 222. Based on the metadata matching one or more particular rules, the policy engine 140 may determine the remote queue 156, 158, 224, . . . that corresponds to the matching rule, and may generate an event notification in accordance with that rule. As discussed additionally below, multiple event notifications 222 may be generated from a single event that matches multiple different rules, and the event notifications 222 may be sent to different queues 156, 158, 224, etc., specified in respective the different matching rules. Accordingly, specific types of event notifications 222 may be delivered to specific applications 120 through respective designated queues 156, 158, 224, . . . , provided on the network storage systems 104(1)-104(N).

In some examples herein, each separate notification rule may be assigned to or otherwise associated with a different target queue at a remote network storage system 104. The notification configuration may include notification rules specified by users, such as users 112 or administrative users 121, as discussed above. For instance, each notification rule may specify at least the target queue (e.g., a queue identifier and an identifier of the hosting network storage system 104 that hosts the target queue) and a rule expression (including one or more conditions) to be decided for determining whether an event notification should be sent or not.

In some cases, the rule expression may include a large number of conditions using constructs such as AND, OR, GREATER, LESS, EQUAL, etc. or equivalents thereof, depending on the programming language used. Accordingly, one notification rule can potentially describe any conditions for a single target queue. For example, the following rule expression has nine conditions that are to be met for generating an event notification: "(((size>10 MB) && (suffix=.mp4∥suffix=.avi) && (Jan. 1, 2018<date-created && date-created<Dec. 31, 2018))∥((x-amz-replication-status=COMPLETED) && (tag/project=ABC && tag/deadline: 2021)∥tag/importance: HIGH))". Further, while several examples of rules, conditions, and configurations for sending event notifications are described with respect to FIG. 2, numerous other variations will be apparent to those of skill in the art having the benefit of the disclosure herein.

Figure 3:
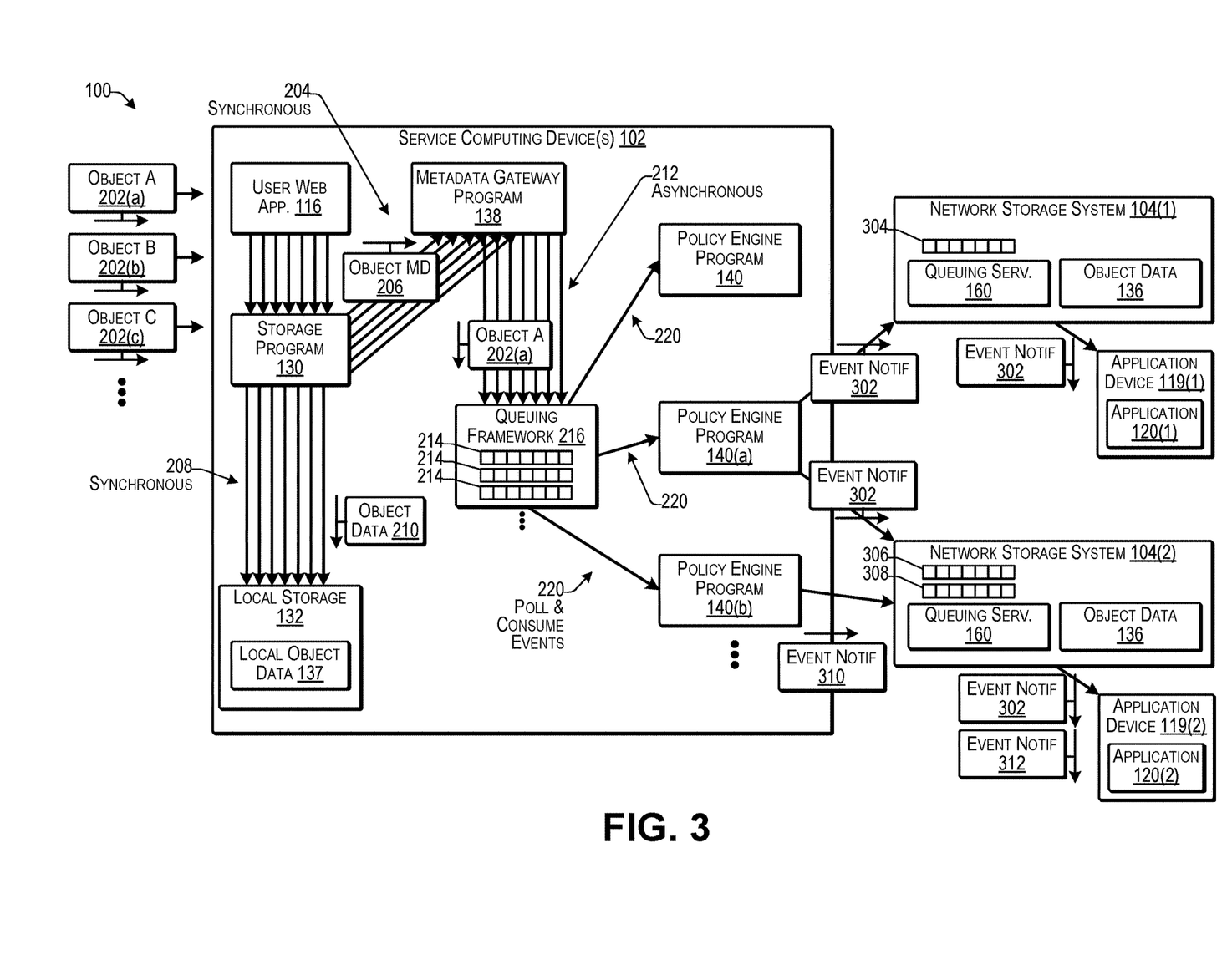
FIG. 3 is a block diagram illustrating an example logical configuration including sending multiple event notifications to multiple queues according to some implementations.

FIG. 3 is a block diagram illustrating an example logical configuration 300 including sending multiple event notifications to multiple queues according to some implementations. For example, as mentioned above a single event may match multiple notification rules, which may result in multiple instances of the same event notification 302 being sent to multiple different queues, respectively, at the network storage system(s) 104. In this example, suppose that a first network storage system 104(1) includes a first queue 304 configured to provide event notifications to a first application 120(1) on a first application device 119(1). In addition, suppose that a second network storage system 104(2) includes a second queue 306 and third queue 308, both of which are configured to provide event notifications to a second application 120(2) on a second application device 119(2). In some examples, the second network storage system 104(2) may be a public or commercial network storage system while in other examples, the second network storage system 104(2) may be a private, proprietary, or on-premises network storage system, or the like.

Furthermore, suppose that a program policy engine in each instance 140(s) pulls a synchronization event from one of the queues 214 and examines metadata associated with the synchronization event to determine applicability of a first notification rule corresponding to the first queue 304 and a second notification rule corresponding to the second queue 306. If the first notification rule and the second notification rule both apply to the particular synchronization event, the policy engine program 140(a) may generate an event notification 302 and may send the event notification 302 to both the first queue 304 and the second queue 306. For instance, the first application 120(1) may receive the event notification 302 from the first queue 304.

In addition, suppose that a policy engine program instance pulls a synchronization event from another one of the queues 214, examines the synchronization event for applicability of a third notification rule corresponding to the third queue 308. Upon determining that the third notification rule applies to the particular synchronization event, the policy engine program instance 140(b) may generate an event notification 310 that is sent to the third queue 308. In this example, suppose that the second application 120 is configured to pull event notifications from both the second queue 306 and the third queue 308. Accordingly, the second application 120 may receive both the event notification 302 and the event notification 310.

In the examples herein, users may be able to specify the event notifications that they will receive by setting up corresponding notification rules. Each notification rule may include a rule expression that sets forth one or more conditions. Each notification rule may further and specify a target queue for receiving event notifications corresponding to that notification rule. In some examples, multiple notification rules may be grouped into a single notification policy. For instance, suppose that a first Notification Policy includes the following two notification rules:

Notification Rule 1: send an event notification to a queue "myqueue1" for any deleted object where the object's size is greater than X, and the object extension is Y or Z, and the object was created between M and N dates. The rule expression in pseudocode for Rule 1 may be as follows: "((size >10 MB) && (suffix=.mp4∥suffix=.avi) && (Jan. 1, 2018<date-created && date-created<Dec. 31, 2018))".

Notification Rule 2: send an event notification to a queue "myqueue2" for any new object where the object's size is greater than X and the object was copied (replicated) from another system. The rule expression in pseudocode for Rule 2 may be as follows: "((size>1 MB) && (replica=true))". Accordingly, the first rule results in event notifications being sent to a first queue "myqueue1" and the second rule results in event notifications being sent to a second queue "myqueue2".

As mentioned above, the system herein may allow an event notification to be sent to two or more different targets. Further, an event notification may be delivered to a cloud network storage system and/or to on-premises network storage systems and/or other on premises targets. Moreover, the system enables sending of the same event notification to one or more queueing services on one or more public network storage systems and to one or more queueing services located on-premises with the object storage system 100, e.g., in different locations.

Each event is handled by a respective instance of the policy engine program. All rule processing for a particular selected event will be handled by the respective policy engine instance that selected the event for processing. In addition, while the same event notification may be sent to multiple target queues, the policy engine program 140 may be configured to ensure that the same event notification is not sent more than once to the same target queue. Accordingly, in some examples, to achieve this goal, configuring multiple notification rules that might generate two notifications for a single event to same queue may not be permitted during the rule setting, such as when a user is setting up the rules.

The following notification rule configurations illustrate the above statements. For instance, the following three notification rules may be permitted for processing by an instance of the policy engine program 140, since each notification rule with rule expressions targets a separate queue:

Notification Rule 1: expression=(E1); Queue="queue1"
Notification Rule 2: expression=(E1); Queue="queue2"
Notification Rule 3: expression=(E2); Queue="queue3"

On the other the following two rules may not be allowed if they can result in two event notifications for a single event going to the same queue, but would be permitted, such as in the situation that the expressions E1 and E2 are mutually exclusive so that only one event notification to queue 4 can be generated for any event:

Notification Rule 1: expression=(E1); Queue="queue4"
Notification Rule 2: expression=(E2); Queue="queue4"

For example, a respective policy engine program instance may take one of the received events from an internal queue 214, may compare the event with each of the rules currently in effect, and based on comparison of the rules with the selected event, may determine to which of the external queues 304, 306, or 308 to send the event notification, if any.

As another example, the queuing of the event notifications may be partitioned so that any given policy engine program instance might only have a partial view of the system namespace (e.g., a subset of "buckets") but since the bucket configuration defines the notification policies, the system may be able to ensure that the policy engine program instances servicing a particular queue (e.g., subset of buckets) is capable of determining all applicable rules for each event notification.

Figure 4:
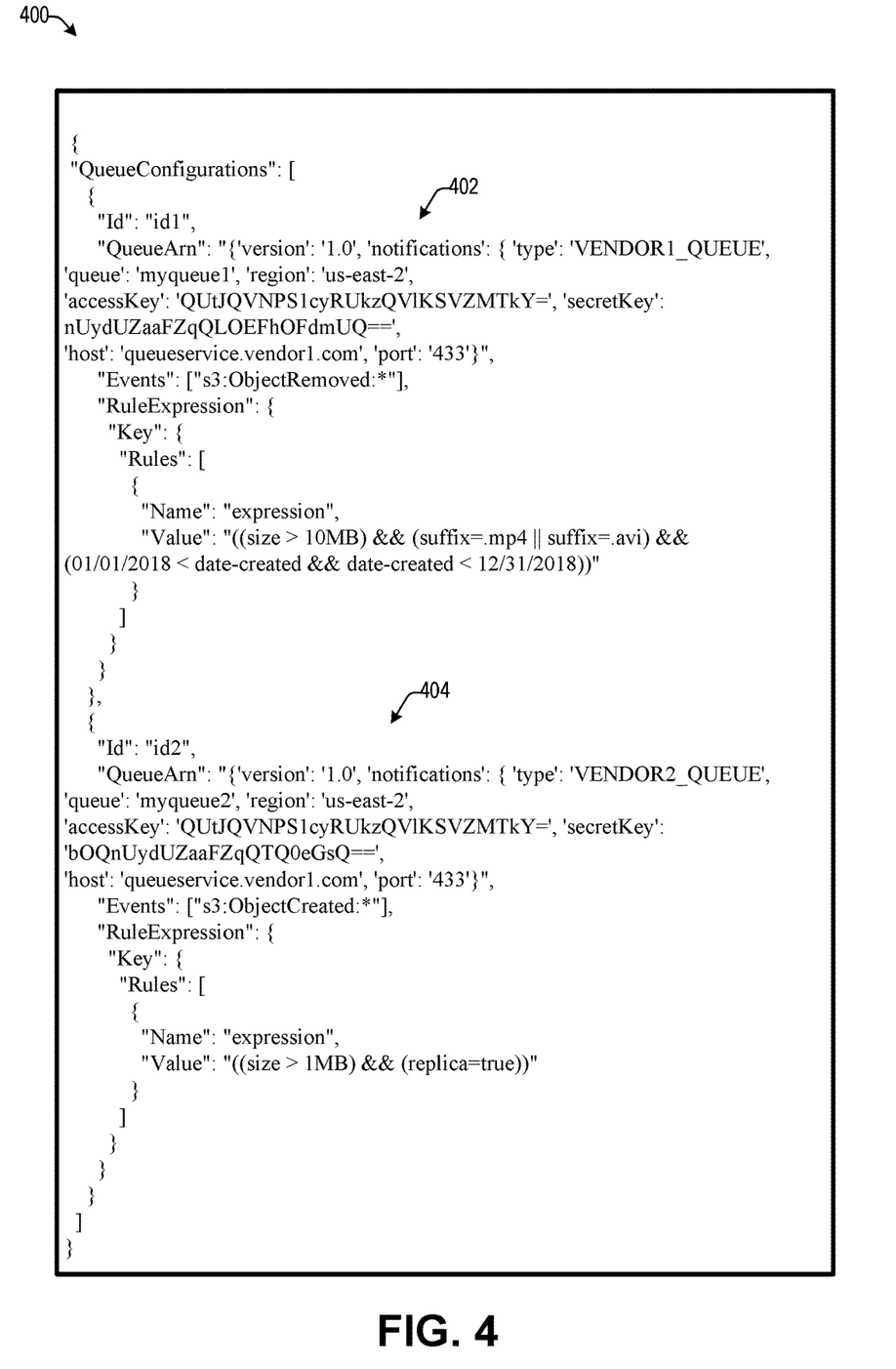
FIG. 4 is a diagram illustrating an example of pseudocode according to some implementations.

FIG. 4 is a diagram illustrating an example of pseudocode 400 according to some implementations. In this example, pseudocode for two notification rules is provided. For example, a first notification rule 402 example provides pseudocode for the Notification Rule 1 of the first Notification Policy discussed above with respect to FIG. 3. For example, the first notification rule 402 specifies the queue name, i.e., "myqueue1", a host name, an access key for the host, the type of event (object removed), and the rule expression, i.e., "((size>10 MB) && (suffix=.mp4||suffix=.avi) && (Jan. 1, 2018<date-created && date-created<Dec. 31, 2018))".

Similarly, the second notification rule 404 specifies the queue name, i.e., my Q2, a host name, and access key for the host, the type of event (object created), and the rule expression, i.e., "((size >1 MB) && (replica=true))".

Figure 5:
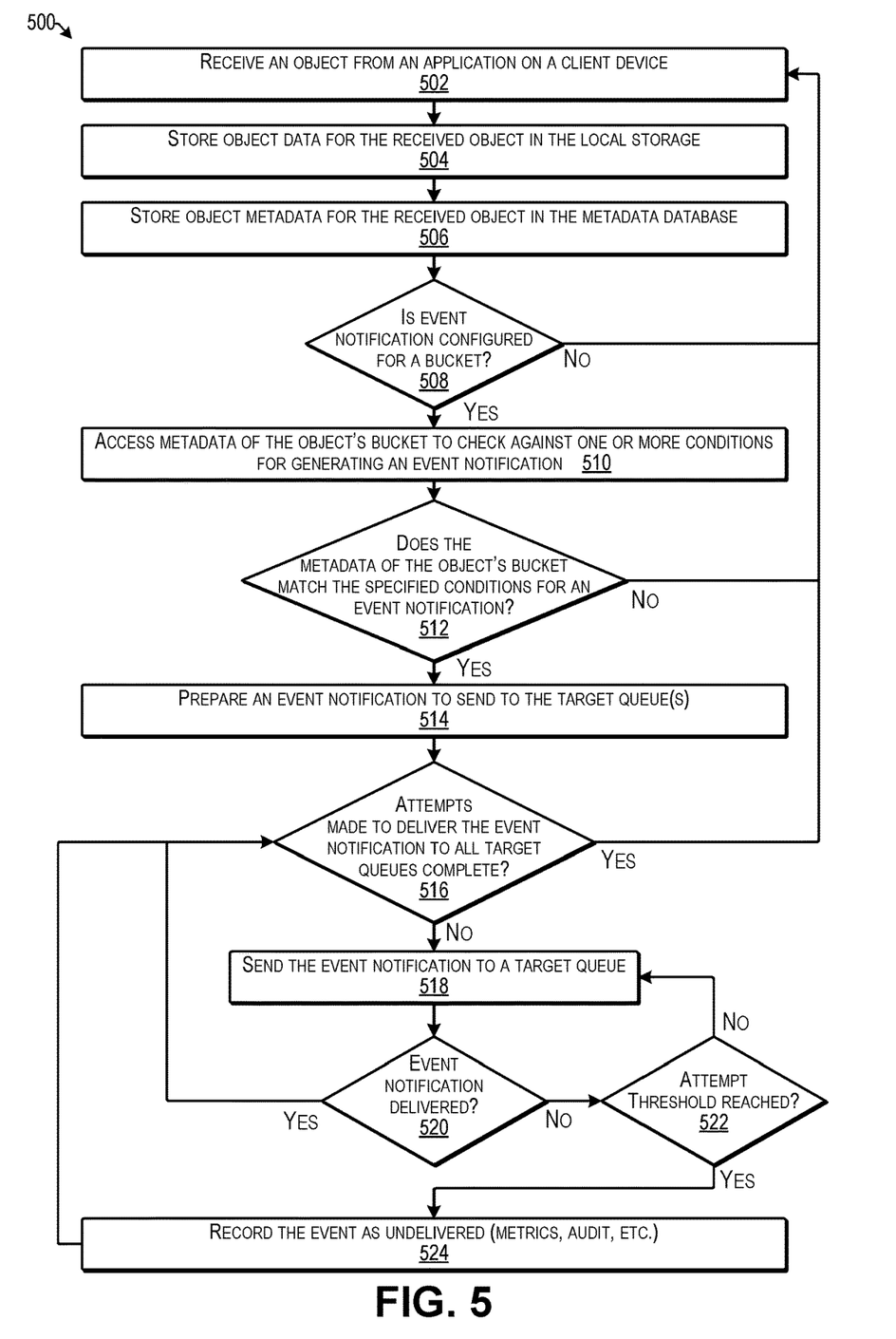
FIG. 5 is a flow diagram illustrating an example process for sending event notifications according to some implementations.

FIG. 5 is a flow diagram illustrating an example process 500 for sending an event notification according to some implementations. The process 500 is illustrated as a collection of blocks in a logical flow diagram, which represents a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems. In the example of FIG. 5, the process 500 may be executed at least in part by the one or more service computing devices 102, or other suitable computing device, executing the storage program 130, the metadata gateway program 138, and/or the policy engine program 140.

At 502, the computing device may receive an object from an application on a client device. For example, the computing device may receive an object for storage in at least one bucket at a storage location, or may receive other instructions, such as a deletion request, that may affect an object already stored by the storage system.

At 504, the computing device may store object data for the received object in the local storage. For example, the computing device may perform a synchronous storage procedure to immediately store the received object data of the received object. The computing device may subsequently asynchronously store the object data to a network storage system, e.g., as discussed above with respect to FIG. 1. For instance, the object data may be stored to a designated bucket at the network storage system.

At 506, the computing device may store object metadata for the received object in the metadata database. For example, the computing device may perform a synchronous storage procedure to immediately store metadata for the received object in the metadata database. As mentioned above, the synchronous storage procedures may enable the object storage system to return an acknowledgment to the user device in real time.

At 508, the computing device may determine whether an event notification corresponding to the received object is configured for a bucket on a network storage system. For example, a "bucket" (e.g., a stored object container) may define policies for routing event notifications. As one example, a configuration of the parent bucket may determine the event processing (if any) for the individual objects contained in that bucket. If so, the process goes to 512. If not, the receipt of the object does not need to be synchronized with the network storage system, an event notification does not need to be sent, and the process goes to 502 to receive a next object.

At 510, the computing device may access metadata of the object's bucket to check against one or more specified conditions for generating an event notification. As one example, a policy engine program instance may access metadata related to the bucket configuration of the bucket to which the object is to be stored. For instance, the policy engine program instance may initially obtain the metadata from the metadata database and may maintain the bucket configuration metadata in a memory cache for improving performance. The policy engine program instance may register listeners with the lower level metadata framework to be notified of any changes to this bucket metadata. Accordingly, rather than having to read from the metadata database each time, the policy engine program instance may instead read from cached metadata for performance reasons and may listen for any change notifications. A change notification may cause the policy engine program instance to re-read the stale bucket metadata from the metadata database.

At 512, the computing device may determine whether the metadata of the object's bucket matches the specified conditions for generating an event notification. If so, the process goes to 514. If not, the process returns to 502 to receive a next object.

At 514, the computing device may prepare an event notification to send to one or more target queues specified by one or more notification rules that match the metadata of the object.

At 516, the computing device may determine whether an attempt has been made to deliver the event notification to all target queues corresponding to all matching notification rules. If so, the process returns to 502 to receive a next object. If not, the process goes to 518.

At 518, the computing device may send the event notification to a target queue. In particular, the computing device may send the event notification to a target queue to which the event notification has not yet been delivered.

At 520, the computing device may determine whether the event notification was delivered to the target queue. For example, the computing device may determine whether an acknowledgment was received from the network storage system that hosts the target queue. If so, the process goes back to 516 to check for any additional target queues to which delivery has not yet been completed. If not, the process goes to 522.

At 522, the computing device may determine whether a threshold number of attempts to deliver the event notification has been reached. For example, the system may attempt to deliver an event notification a threshold number of times after which the system may determine that the event notification is undeliverable. Accordingly, if the threshold has not been reached, the process returns to 518. On the other hand, if the threshold has been reached, the process goes to 524.

At 524, if a delivery acknowledgement is not received after the threshold number of attempts has been reached, the computing device may record the event as undelivered, such as for purposes of counting metrics, auditing information, and the like. From the foregoing, it may be seen that the system herein is configured to achieve a high level of reliability: when the system is appropriately configured (enough service computing devices, storage capacity, etc.), all event notifications should be delivered if the target system hosting the target queue(s) is functioning properly and available. In addition, the system is able to handle situations in which a target queue is temporarily out of service or otherwise unavailable (e.g., due to connectivity issues or the like). In such cases, the system herein may attempt to deliver an event notification for a threshold number of attempts using a retry mechanism. Furthermore, it may be possible to improve the level of event notification reliability by increasing the number of resources in the object storage system, such as by increasing the capacity for the messaging queueing service, adding more computing devices for executing the policy engine instances, and so forth. In addition, the system herein may keep track of every event notification that could not be delivered to the respective target queue within a specified time interval. Such event notifications may be counted as metrics for visibility, and may be separately recorded for further examination by users.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 6:
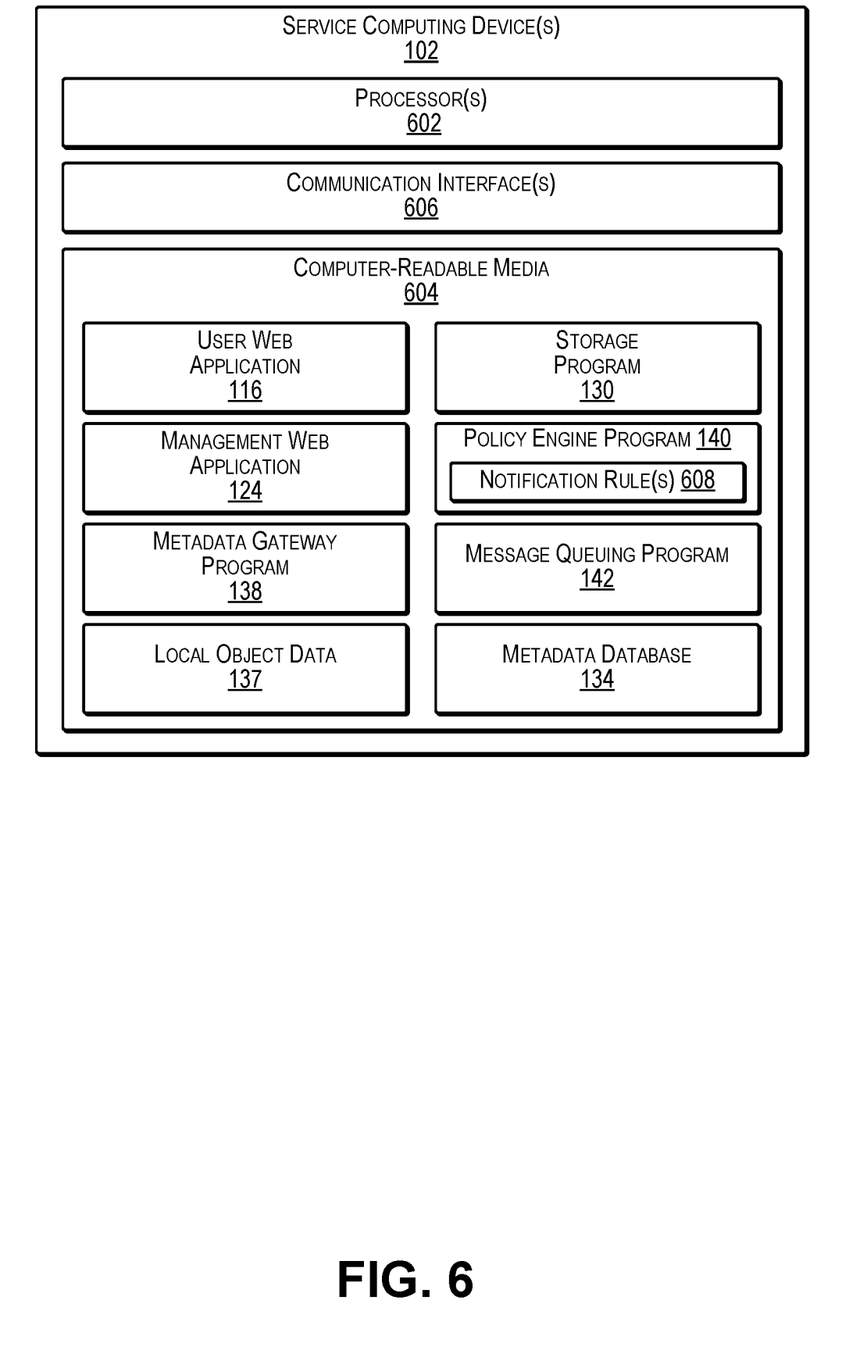
FIG. 6 illustrates select example components of the service computing device(s) that may be used to implement at least some of the functionality of the systems described herein.

FIG. 6 illustrates select example components of the service computing device(s) 102 that may be used to implement at least some of the functionality of the systems described herein. The service computing device(s) 102 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. Multiple service computing device(s) 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, the service computing device(s) 102 includes, or may have associated therewith, one or more processors 602, one or more computer-readable media 604, and one or more communication interfaces 606. Each processor 602 may be a single processing unit or a number of processing units, and may include single or multiple computing units, or multiple processing cores. The processor(s) 602 can be implemented as one or more central processing units, microprocessors, microcomputers, microcontrollers, digital signal processors, state machines, logic circuitries, and/or any devices that manipulate signals based on operational instructions. As one example, the processor(s) 602 may include one or more hardware processors and/or logic circuits of any suitable type specifically programmed or configured to execute the algorithms and processes described herein. The processor(s) 602 may be configured to fetch and execute computer-readable instructions stored in the computer-readable media 604, which may program the processor(s) 602 to perform the functions described herein.

The computer-readable media 604 may include volatile and nonvolatile memory and/or removable and non-removable media implemented in any type of technology for storage of information, such as computer-readable instructions, data structures, program modules, or other data. For example, the computer-readable media 604 may include, but is not limited to, RAM, ROM, EEPROM, flash memory or other memory technology, optical storage, solid state storage, magnetic tape, magnetic disk storage, storage arrays, network attached storage, storage area networks, cloud storage, or any other medium that can be used to store the desired information and that can be accessed by a computing device. Depending on the configuration of the service computing device(s) 102, the computer-readable media 604 may be a tangible non-transitory medium to the extent that, when mentioned, non-transitory computer-readable media exclude media such as energy, carrier signals, electromagnetic waves, and/or signals per se. In some cases, the computer-readable media 604 may be at the same location as the service computing device 102, while in other examples, the computer-readable media 604 may be partially remote from the service computing device 102. For instance, in some cases, the computer-readable media 604 may include a portion of storage in the network storage system(s) 104 discussed above with respect to FIG. 1.

The computer-readable media 604 may be used to store any number of functional components that are executable by the processor(s) 602. In many implementations, these functional components comprise instructions or programs that are executable by the processor(s) 602 and that, when executed, specifically program the processor(s) 602 to perform the actions attributed herein to the service computing device 102. Functional components stored in the computer-readable media 604 may include the user web application 116, the management web application 124, the storage program 130, the metadata gateway program 138, the policy engine program 140, and the message queuing program 142, each of which may include one or more computer programs, applications, executable code, or portions thereof. Further, while these programs are illustrated together in this example, during use, some or all of these programs may be executed on separate service computing devices 102. In this example, the policy engine program 140 includes or may access notification rule(s) 608, such as the notification rules discussed above with respect to FIGS. 1-5.

In addition, the computer-readable media 604 may store data, data structures, and other information used for performing the functions and services described herein. For example, the computer-readable media 604 may store the metadata database 134 and the local object data 137. Further, while these data structures are illustrated together in this example, during use, some or all of these data structures may be stored on or by separate service computing devices 102. The service computing device 102 may also include or maintain other functional components and data, which may include programs, drivers, etc., and the data used or generated by the functional components. Further, the service computing device 102 may include many other logical, programmatic, and physical components, of which those described above are merely examples that are related to the discussion herein.

The one or more communication interfaces 606 may include one or more software and hardware components for enabling communication with various other devices, such as over the one or more network(s) 106 and 107. For example, the communication interface(s) 606 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a first computing device able to communicate with a plurality of network storage systems over a network, including a first network storage system provided by a first service provider and a second network storage system provided by a second service provider that is different from the first service provider, the first network storage system providing a first plurality of target queues and the second network storage system providing a second plurality of target queues, the first computing device configured by executable instructions to perform operations comprising:
creating a plurality of local queues for the first computing device, the plurality of local queues configured to receive synchronization events that correspond to storage events to be synchronized to one or more of the plurality of network storage systems, wherein each local queue corresponds to a selected network storage system of the plurality of network storage systems;
receiving, at the first computing device, from a client device, a first object for storage;
adding a synchronization event for the first object to a first local queue of the plurality of local queues, the first local queue corresponding to the first network storage system;
executing a plurality of instances of policy engines that are configured to consume synchronization events from the plurality of local queues for performing synchronization of storage events to the network storage systems;
consuming, by a first instance of the policy engines, the synchronization event for the first object;
determining, by the first instance of the policy engines, from metadata for the first object, whether the metadata for the first object matches at least one notification rule;
based on determining that the metadata for the first object matches a rule expression of a first notification rule, generating by the first instance of the policy engines, a first event notification corresponding to the first object;
synchronizing, by the first instance of the policy engines, the first object to the first network storage system; and
sending, by the first instance of the policy engines, the first event notification to a first target queue specified by the first notification rule, wherein the first target queue is one of the first plurality of target queues provided by the first network storage system.

2. The system as recited in claim 1, the operating further comprising:
based on determining that the metadata for the first object matches a rule expression of a second notification rule, sending, by the first instance of the policy engines, the first event notification to a second target queue specified by the second notification rule, wherein the second target queue is different from the first target queue.

3. The system as recited in claim 2, wherein the second target queue is one of the second plurality of target queues provided by the second network storage system that is provided by the second service provider that is different from the first service provider.

4. The system as recited in claim 2, wherein the second target queue is one of the first plurality of target queues provided by the first network storage system.

5. The system as recited in claim 1, the operations further comprising executing a second instance of the policy engines on the first computing device, the second instance of the policy engines configuring the first computing device to:
consume, from a second local queue of the plurality of local queues, another synchronization event corresponding to another storage event;
compare information related to the other storage event with the rule expression of the first notification rule that specifies the first target queue;
compare the information related to the other storage event with a rule expression of a second notification rule that also specifies the first target queue; and
in response to determining that the information related to the other storage event matches the rule expression of the first notification rule and the rule expression of the second notification rule, sending only a single instance of another event notification to the first target queue.

6. The system as recited in claim 1, the operations further comprising:
executing a second instance of the policy engines that compares the metadata of the first object with a rule expression of a second notification rule, the second notification rule specifying a second target queue that is different from the first target queue.

7. The system as recited in claim 1, based on determining that the metadata for the first object matches a rule expression of a second notification rule that specifies a second target queue of the plurality of target queues provided by the second network storage system, generating, by the first instance of the policy engines, a second event notification corresponding to the first object; and
sending, by the first instance of the policy engines, the second event notification to the second target queue specified by the second notification rule.

8. The system as recited in claim 1, the operations further comprising executing a message queuing program on the first computing device, the message queuing program providing the plurality of local queues for queueing synchronization events for synchronizing storage events to the plurality of network storage systems.

9. The system as recited in claim 1, wherein the rule expression of the first notification rule includes at least one condition to be met for the rule expression to match the metadata of the first object.

10. The system as recited in claim 1, the operations further comprising:

storing object data of the first object in a local storage and storing the metadata for the first object in a metadata database; and
accessing the metadata for the first object in the metadata database to compare the metadata for the first object with the rule expression of the first notification rule for determining that the metadata for the first object matches the rule expression of the first notification rule.

11. The system as recited in claim 1, wherein the first target queue is configured to be accessed by an application executing on an application computing device that accesses the first network storage system for receiving the first event notification from the first target queue.

12. A method comprising:
connecting a first computing device for communication with a plurality of network storage systems over a network, including a first network storage system provided by a first service provider and a second network storage system provided by a second service provider that is different from the first service provider, the first network storage system providing a first plurality of target queues and the second network storage system providing a second plurality of target queues;
creating, by the first computing device, a plurality of local queues for the first computing device, the plurality of local queues configured to receive synchronization events that correspond to storage events to be synchronized to one or more of the plurality of network storage systems, wherein each local queue corresponds to a selected network storage system of the plurality of network storage systems;
receiving, by a first computing device, from a client device, a first object for storage;
adding a synchronization event for the first object to a first local queue of the plurality of local queues, the first local queue corresponding to the first network storage system;
executing a plurality of instances of policy engines that are configured to consume synchronization events from the plurality of local queues for performing synchronization of storage events to the network storage systems;
consuming, by a first instance of the policy engines, the synchronization event for the first object;
determining, by the first instance of the policy engines, from metadata for the first object, whether the metadata for the first object matches at least one notification rule;
based on determining that the metadata for the first object matches a rule expression of a first notification rule, generating, by the first instance of the policy engines, a first event notification corresponding to the first object;
synchronizing, by the first instance of the policy engines, the first object to the first network storage system; and
sending, by the first instance of the policy engines, the first event notification to a first target queue specified by the first notification rule, wherein the first target queue is one of the first plurality of target queues provided by the first network storage system.

13. The method as recited in claim 12, further comprising:
based on determining that the metadata for the first object matches a rule expression of a second notification rule, sending, by the first instance of the policy engines, the first event notification to a second target queue specified by the second notification rule, wherein the second target queue is different from the first target queue.

14. The method as recited in claim 12, further comprising executing a second instance of the policy engines on the first computing device, the second instance of the policy engines configuring the first computing device to:
- consume, from a second local queue of the plurality of local queues, another synchronization event corresponding to another storage event; and
- compare information related to the other storage event with the rule expression of the first notification rule that specifies the first target queue;
- compare the information related to the other storage event with a rule expression of a second notification rule that also specifies the first target queue; and
- in response to determining that the information related to the other storage event matches the rule expression of the first notification rule and the rule expression of the second notification rule, sending only a single instance of another event notification to the first target queue.

15. The method as recited in claim 12, wherein the first target queue is configured to be accessed by an application executing on an application computing device that accesses the first network storage system for receiving the first event notification from the first target queue.

16. The method as recited in claim 12, further comprising:
- storing object data of the first object in a local storage and storing the metadata for the first object in a metadata database; and
- accessing the metadata for the first object in the metadata database to compare the metadata for the first object with the rule expression of the first notification rule for determining that the metadata for the first object matches the rule expression of the first notification rule.

17. One or more non-transitory computer-readable media storing instructions that, when executed by one or more processors of a first computing device, configure the first computing device to perform operations comprising:
- configuring the first computing device for communication with a plurality of network storage systems over a network, including a first network storage system provided by a first service provider and a second network storage system provided by a second service provider that is different from the first service provider, the first network storage system providing a first plurality of target queues and the second network storage system providing a second plurality of target queues;
- creating, by the first computing device, a plurality of local queues for the first computing device, the plurality of local queues configured to receive synchronization events that correspond to storage events to be synchronized to one or more of the plurality of network storage systems, wherein each local queue corresponds to a selected network storage system of the plurality of network storage systems;
- receiving, by the first computing device, from a client device, a first object for storage;
- adding a synchronization event for the first object to a first local queue of the plurality of local queues, the first local queue corresponding to the first network storage system;
- executing a plurality of instances of policy engines that are configured to consume synchronization events from the plurality of local queues for performing synchronization of storage events to the network storage systems;
- consuming, by a first instance of the policy engines, the synchronization event for the first object;
- determining, by the first instance of the policy engines, from metadata for the first object, whether the metadata for the first object matches at least one notification rule;
- based on determining that the metadata for the first object matches a rule expression of a first notification rule, generating, by the first instance of the policy engines, a first event notification corresponding to the first object;
- synchronizing, by the first instance of the policy engines, the first object to the first network storage system; and
- sending, by the first instance of the policy engines, the first event notification to a first target queue specified by the first notification rule, wherein the first target queue is one of the first plurality of target queues provided by the first network storage system.

18. The one or more non-transitory computer-readable media as recited in claim 17, the operations further comprising:
- based on determining that the metadata for the first object matches a rule expression of a second notification rule, sending, by the first instance of the policy engines, the first event notification to a second target queue specified by the second notification rule, wherein the second target queue is different from the first target queue.

19. The one or more non-transitory computer-readable media as recited in claim 17, the operations further comprising executing a second instance of the policy engines on the first computing device, the second instance of the policy engines configuring the first computing device to:
- consume, from a second local queue of the plurality of local queues, another synchronization event corresponding to another storage event; and
- compare information related to the other storage event with the rule expression of the first notification rule that specifies the first target queue;
- compare the information related to the other storage event with a rule expression of a second notification rule that also specifies the first target queue; and
- in response to determining that the information related to the other storage event matches the rule expression of the first notification rule and the rule expression of the second notification rule, sending only a single instance of another event notification to the first target queue.

20. The one or more non-transitory computer-readable media as recited in claim 17, the operations further comprising:
- storing object data of the first object in a local storage and storing the metadata for the first object in a metadata database; and
- accessing the metadata for the first object in the metadata database to compare the metadata for the first object with the rule expression of the first notification rule for determining that the metadata for the first object matches the rule expression of the first notification rule.

* * * * *